United States Patent [19]

Rail

[11] Patent Number: 4,723,399
[45] Date of Patent: Feb. 9, 1988

[54] COTTON PICKER BAR ASSEMBLY

[75] Inventor: Clarence H. Rail, Ankeny, Iowa

[73] Assignee: Deere & Company, Moline, Ill.

[21] Appl. No.: 884,459

[22] Filed: Jul. 11, 1986

[51] Int. Cl.$^4$ ............................................. A01D 46/08
[52] U.S. Cl. ............................................. 56/44; 56/41
[58] Field of Search ........................... 56/28, 40–44, 56/48; 29/447

[56] References Cited

U.S. PATENT DOCUMENTS

| | | | |
|---|---|---|---|
| 44,434 | 9/1864 | Mothe | 29/447 |
| 2,766,574 | 10/1956 | Hubbard | 56/44 |
| 3,031,831 | 5/1962 | Jennings et al. | 56/44 |
| 4,463,543 | 8/1984 | Hubbard et al. | 56/41 |

Primary Examiner—John Weiss

[57] ABSTRACT

An improved picker bar assembly for a cotton harvester includes a thin cylindrical sleeve which is pressed onto the upper end of the picker bar. The sleeve has an inner diameter which is smaller than the outer diameter of the upper end, a lower portion defining the journal area between the picker bar and the picker drum head, and an upper area which mounts the cam arm. The sleeve increases the shear and bending strength and fatigue life of the upper portion of the picker bar, particularly adjacent the grease hole which communicates lubricant between the hollow interior of the picker bar and the journal area.

12 Claims, 3 Drawing Figures

COTTON PICKER BAR ASSEMBLY

BACKGROUND OF THE INVENTION

The present invention relates generally to a cotton harvester, and more specifically to an improved picker bar assembly for the drum of a cotton picker.

Cotton picker bar assemblies, such as shown and described in U.S. Pat. No. 4,463,543, include an upright picker bar journalled in the drum head of an upright cotton picking unit. Presently available picker bars are fabricated from an aluminum extrusion and include an upper end connected to a cam follower arm. The follower arm is seated in a cam track to properly orient the bar during harvesting so that the spindles, which are rotatably mounted in the bar, are maintained in a preselected attitude when removing cotton from the plants and when passing by the doffers and the moistener pads.

Fracturing, shearing and bending of the aluminum picker bar has been a continuing problem since the bar is one of the weakest members of the havesting unit and can be subjected to very high loading when the row unit is grounded or encounters an article such as a stump or rock. The upper end of the picker bar adjacent the grease hole for the drum head journal area and the upper end of the bar just below the cam follower arm are likely trouble areas for fracturing and shearing, respectively. A broken picker bar results in a considerable amount of expense and downtime.

OBJECTS OF THE INVENTION

It is therefore an object of the present invention to provide an improved picker bar for a cotton harvester. It is a further object to provide a method for manufacturing an improved cotton picker bar.

It is another object of the present invention to provide a cotton picker bar having increased resistance to fracturing, shearing and bending. It is a further object to provide a method of manufacturing such an improved cotton picker bar.

It is yet another object of the present invention to provide an improved cotton picker bar which has increased lifetime and which does not require a cam arm extension located over the upper end of the picker bar. It is yet a further object to provide such a cotton picker bar with a wear surface which significantly increases the shear resistance and enhances fracture resistance of the upper end of the bar. It is another object of the invention to provide a method for manufacturing such a cotton picker bar having increased shear and fatigue resistance.

BRIEF DESCRIPTION OF THE INVENTION

In accordance with the above objects, a cold drawn steel cylinder having an inner diameter slightly smaller than the outer diameter of the upper end of the picker bar is heated and quickly pressed over the end of the picker bar. As the cylinder cools, it contracts tightly around the end of the picker bar to greatly increase the strength and fatigue life of the upper end of the bar. The lower portion of the cylinder acts as a wear surface for the bar relative to the drum head journal. A hole is drilled through the lower portion and communicates with a hole in the cast picker bar for supplying lubricant to the drum head journal area. The upper end of the cylinder is notched to define a keyway which secures the cam follower arm against rotation on the top of the picker bar. The cam follower arm is pressed over the upper end of the cylinder which is held securely on the end of the picker bar by the shrink fit. The cylinder more than doubles the shear strength of the bar and increases the fatigue life several times over that of similar bars without the press-fitted cylinder.

The picker bar assembly also reduces tooling costs for manufacturing when compared with an arrangement such as shown in the fore-mentioned U.S. Pat. No. 4,463,543 wherein an extension of the arm is press-fitted over the picker bar. The cylinder is dimensionsd so that the improved picker bar assembly may be retrofitted onto drum heads presently utilizing the weaker, conventional picker bar assemblies.

These and other objects, features and advantags will become apparent to one skilled in the art upon reading the following detailed description in view of the drawings.

DESCRIPTION OF THE PREFERRED EMBODIMENT

Figure 1:
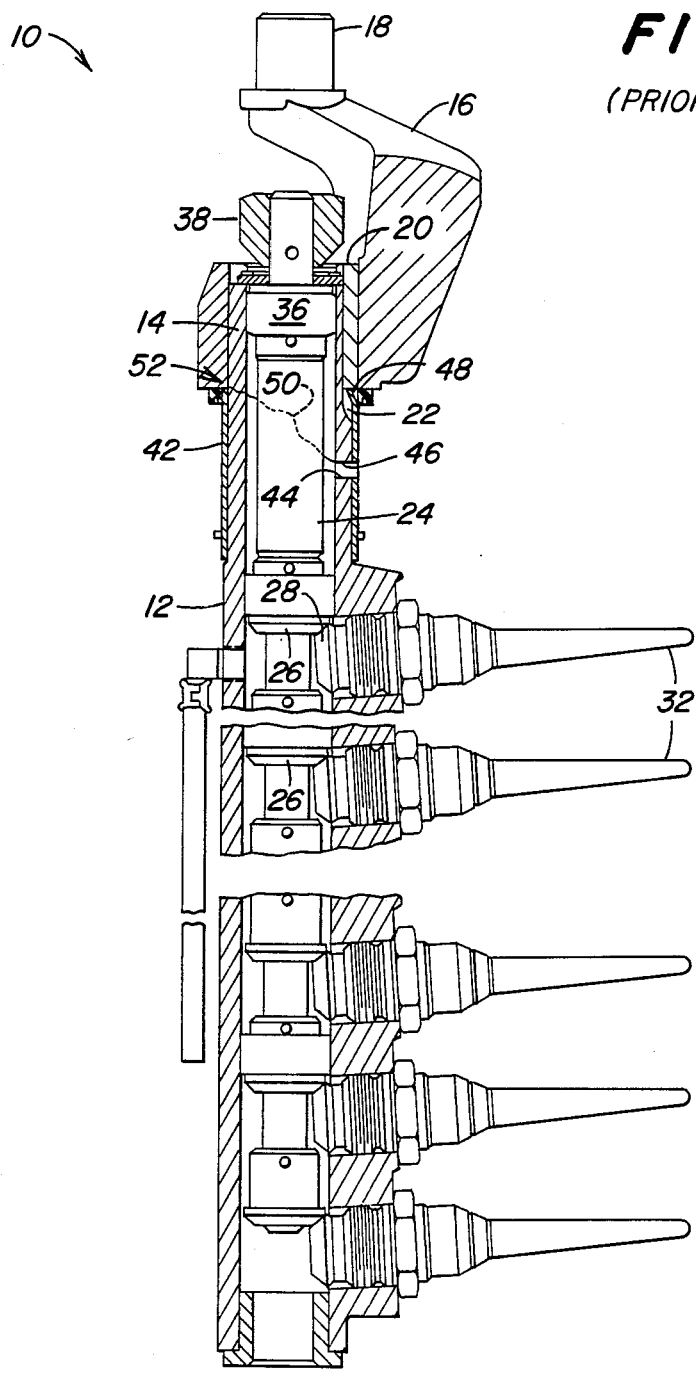
FIG. 1 is an enlarged view, partially in section, of a conventional picker bar assembly.

Referring now to FIG. 1, there is shown a conventional picker bar assembly 10 typical of the prior art and including a picker bar 12 having an upper end 14 adapted for journalling in the drum head (not shown) of a conventional cotton harvester. The upper end 14 nonrotatably secures a cast can arm 16 with a cam follower 18 adapted for seating in a cam track (not shown) fixed to the unit housing. The cam arm 16 is secured against rotation with respect to the picker bar 12 by a key 20 positioned in a keyway 22 machined in the upper end of the bar 12. For a more detailed description of the picker drum and drive assemblies, reference may be had to fore-mentioned U.S. Pat. No. 4,463,543, as well as U.S. Pat. Nos. 4,133,166 and 3,245,210, incorporated herein by reference for background material.

Each picker bar 12 is hollow and supports a spindle drive shaft 24 having pinions 26 which mesh with and drive bevel pinions 28 on the inner ends of spindles 32. The upper end of the shaft 24 is rotatably mounted in a bearing 36 secured within the hollow interior of the upper end 14 of the picker bar 12. A gear 38 is fixed to the upper end of the shaft 24 and is engaged by a drive gear (not shown) in a conventional manner to rotate the spindles 32.

A wear sleeve 42 is glued over the lower portion of the upper end 14 below the lower end of the cam arm 16 to act as the wear surface between the journal of the picker drum head and the picker bar 12. One side of the sleeve 42 is split the entire length in a direction parallel to the axis of the sleeve to facilitate assembly over the upper end 14. A grease hole 44 extends radially outwardly from the hollow interior of the picker bar 12, and the sleeve 42 is apertured at location 46 to align with the hole 44. A tab 48 on the upper end of the sleeve 42 is bent inwardly into the lower end of the keyway 22 to index the sleeve on the upper end 14 and assure alignment of the aperture 46 with the grease hole 44 so that lubricant can flow from the hollow interior of the picker bar 12 onto the bearing surface defined by the outer surface of the sleeve 42. In a prior art picker bar assembly of the type shown in FIG. 1, a fatigue break indicated at 50 often begins at the corner of the grease hole 44 causing failure of the picker bar 12. A second problem area, indicated generally at 52, is located adjacent the area where the upper end 14 of the picker bar 12 enters the lower portion of the cast cam arm 16. Under heavy loading, the area 52 can shear causing picker bar failure.

Figure 2:
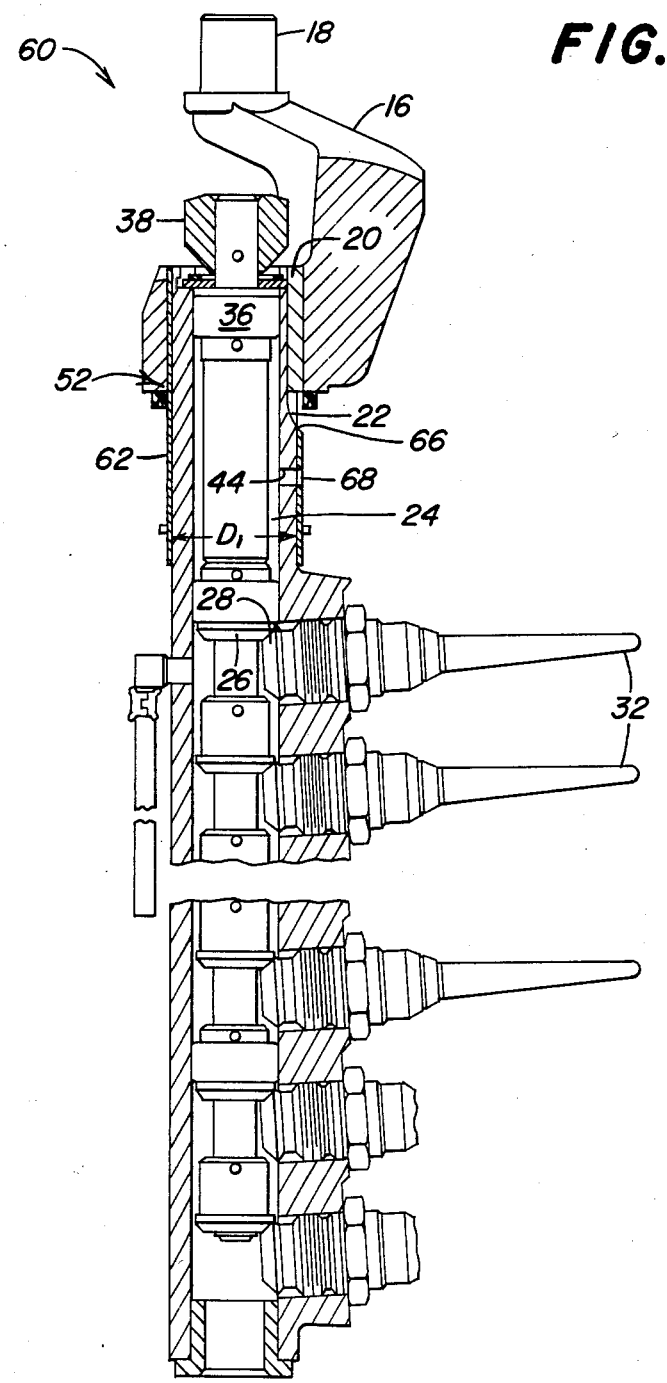
FIG. 2 is a view similar to FIG. 1 but showing the improved picker bar assembly of the present invention.

The improved picker bar assembly 60 of the present invention (FIG. 2) includes a thin cylindrical sleeve 62 shrink fitted onto the upper end 14 of the picker bar 12 to increase the shear strength at location 52 and to increase fatigue life in the area of the picker bar 12 around the grease hole 44. The cylindrical sleeve 62 extends the length of the upper end 14 of the picker bar 12 and is nonrotatably secured within the cast cam arm 16. The area of the sleeve 62 adjacent the keyway 22 is machined at area 66 to receive the key 20 which indexes the cam arm 16 relative to the picker bar 12 and prevents relative rotation therebetween. An aperture 68 is drilled in the sleeve 62 after the sleeve is shrink fitted onto the end 14 to communicate with the grease hole 44 and provide a lubrication path from the hollow interior of the picker bar 12 to the outer surface of the sleeve 62 which is secured within the drum head.

Figure 3:
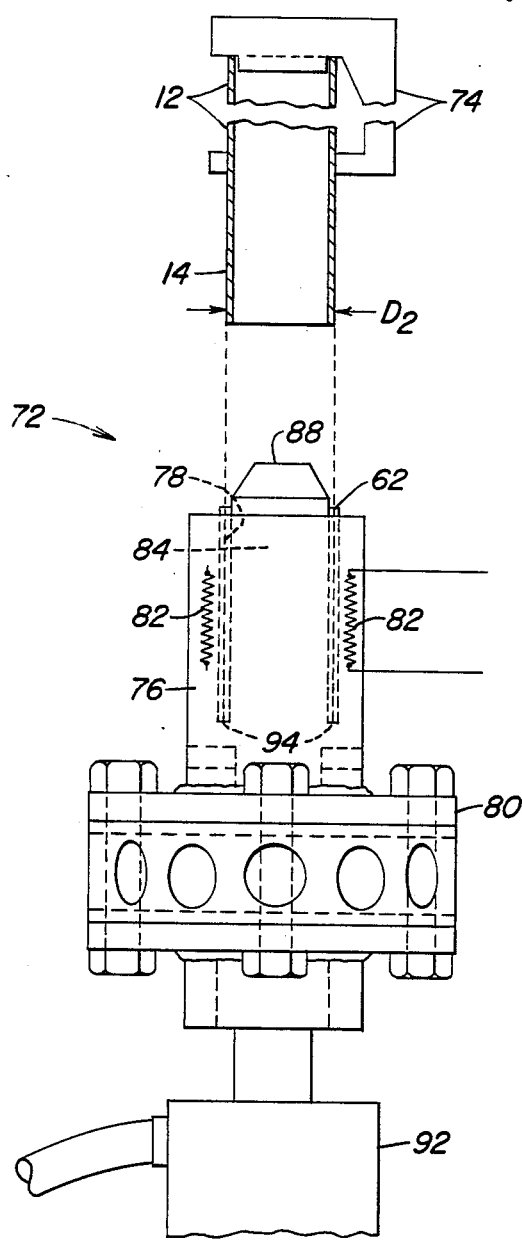
FIG. 3 is a diagrammatic view showing the method and apparatus for assembling the sleeve onto the end of a picker bar.

In the preferred embodiment, the sleeve 62 is fabricated from 1020 cold drawn steel and has a wall thickness of approximately 0.054-0.060 inches. The inner diameter $D_1$ (FIG. 2) of the sleeve 62 is approximately 0.001 to 0.0038 inches smaller than the outer diameter $D_2$ (FIG. 3) of the upper end 14 of the picker bar 12. To assemble the unit, the sleeve 62 is heated to a temperature of approximately 300 to 350 degrees fahrenheit to increase the dimension $D_1$, and thereafter the sleeve 62 is quickly pressed onto the end 14. As the sleeve 62 cools it contracts tightly around the entire end 14. Thereafter the slot area 66 is machined and the aperture 68 is drilled. The upper end of the sleeve 62 then receives the cam arm 16.

In the preferred embodiment, a sleeve press and heater assembly 72 (FIG. 3) is utilized to assemble the cylindrical sleeve 62 onto the bar 12. The bar 12 is secured in an upright position by a holder 74 just above the assembly 72. The assembly 72 includes a sleeve holder 76 attached to a plate 80. The sleeve holder 76 has a cylindrical bore 78, the inner diameter of which is slightly larger than the outer diameter of the sleeve 62 in its fully heated condition. The sleeve holder 76 includes heating elements 82. A locating pin 84 extends upwardly through the bore 78 in the axial direction and has an outer diameter slightly less than the inner diameter of the upper end 14 of the picker bar 12. The locating pin 84 projects above the top edge of the sleeve holder 76 and includes a tapered locating end 88. The plate 80 is operatively connected to the rod end of a cylinder 92.

For assembly, the picker bar 12 is secured in the holder 74 above the assembly 72 in inverted fashion with the upper end 14 directed downwardly adjacent the locating pin 84. The sleeve 62 is preheated to a temperature close to the assembly temperature and is inserted into the bore 78 of the heated sleeve holder 76. The end of the sleeve 62 bottoms against an abutment surface 94 located within the holder 76 such that the opposite end of the sleeve 62 projects slightly above the top of the holder 76 but below the tapered locating end 88 of the locating pin 84. The sleeve 62 is heated to a temperature of at least 300 to 350 degrees fahrenheit, and the cylinder 92 is actuated to quickly move the assembly 72 upwardly relative to the end 14 of the picker bar 12. The tapered end 88 of the locating pin 84 moves into the hollow interior of the picker bar 12 to center the sleeve 62 with respect to the outer diameter of the end 14. The cylinder 92, which applies a pressure from about 3,000 to 8,000 pounds, quickly forces the sleeve 62 over the end 14. The sleeve 62 is cooled rapidly as heat transfers from the sleeve to the picker bar end 14. The cylinder 92 is retracted leaving the sleeve 62 secured to the picker bar. After the sleeve 62 is completely cooled so that a secure fit is provided between sleeve 62 and the end 14, the slot area 66 is machined and the aperture 68 is drilled. Thereafter the cam arm 16 is assembled over the upper end of the sleeve 62. The lower end of the sleeve 62 provides the bearing surface between the drum head and the picker bar 12.

Having described the preferred embodiment, it will be apparent that modifications can be made without departing from the scope of the invention as defined in the accompanying claims.

I claim:

1. A picker bar assembly for a cotton harvester adapted for support in a drum head of a cotton picker drum, said picker bar assembly comprising:
    an upright picker bar having a cylindrically shaped portion of preselected outer diameter;
    means for increasing the fatigue life and shear and bending strength of the picker bar including a cylindrical member pressed over said cylindrical portion of the picker bar, wherein the cylindrically shaped portion comprises the upper end of the picker bar and the cylindrical member includes a lower portion defining a bearing surface adapted for journalling in the drum head and an upper portion; and
    a cam arm fixed against rotation with respect to the picker bar over the upper portion of the cylindrical member.

2. The invention as set forth in claim 1 wherein the cylindrical member comprises a noninterrupted cylinder which at ambient temperature has an inner diameter slightly less than the preselected outer diameter of the cylindrical portion.

3. The invention as set forth in claim 2 wherein said cylindrical member is assembled onto the picker bar by heating the cylindrical member to a temperature substantially above ambient to increase said inner diameter and thereafter pressing the cylindrical member onto the cylindrically shaped portion of the picker bar.

4. The invention as set forth in claim 1 wherein the cylindrical portion of the picker bar includes an aperture area in the cylindrical portion to thereby define an area of nonuniformity particularly susceptible to fatigue cracking, and wherein said cylindrical member extends adjacent the aperture area for preventing fatigue cracking adjacent the aperture area.

5. A method of fabricating a cotton picker bar assembly adapted for support in a drum head of a cotton picker, said method comprising:
    providing an elongated picker bar having a generally cylindrically shaped end of preselected diameter;
    providing a cylindrically shaped sleeve having an inner diameter slightly smaller than said preselected diameter;

pressing the sleeve onto the cylindrically shaped end of the picker bar to thereby increase the fatigue life and shear and bending strength of the picker bar; and securing a cam arm to the cylindrically shaped end of the picker bar, said step of securing including placing the cam arm over a portion of the sleeve and permitting a portion of the sleeve to extend below the cam arm to define a wear surface adapted to be rotatably received by the drum head.

6. The invention as set forth in claim 5 including the step of heating the sleeve prior to the step of pressing to increase the inner diameter of the sleeve, and after the step of pressing, allowing the sleeve to cool and shrink around the cylindrically shaped end.

7. The invention as set forth in claim 5 including drilling a lubrication hole in the portion of the sleeve extending below the cam arm, and wherein the step of providing a picker bar includes providing a hollow picker bar with a second hole extending from the interior of the picker bar through to the surface of the cylindrically shaped end, and aligning the lubrication hole with the second hole.

8. The invention as set forth in claim 6 wherein the step of providing a sleeve comprises fabricating a sleeve from cold drawn steel having an inner diameter approximately 0.001 to 0.0038 inches smaller in diameter than said preselected diameter.

9. The invention as set forth in claim 8 wherein the sleeve has a wall thickness of approximately 0.054 to 0.060 inches.

10. The invention as set forth in claim 5 including providing a sleeve press having a locating pin, positioning the sleeve over the locating pin, and axially moving the locating pin and sleeve with respect to the cylindrically shaped end of the picker bar to press the sleeve onto the end of the picker bar.

11. The invention as set forth in claim 10 including the step of heating the sleeve prior to the step of pressing.

12. The invention as set forth in claim 11 including heating the sleeve after the sleeve is positioned over the locating pin.

* * * * *